United States Patent [19]

Gombos et al.

[11] Patent Number: 5,111,931

[45] Date of Patent: May 12, 1992

[54] UNITIZED PALLETLESS MULTIPLE BALE CARGO UNIT

[75] Inventors: John M. Gombos, Bakersfield; Moshe Leashno, Long Beach, both of Calif.

[73] Assignee: A.C.X., Inc., Bakersfield, Calif.

[21] Appl. No.: 699,772

[22] Filed: May 14, 1991

Related U.S. Application Data

[60] Division of Ser. No. 526,186, May 18, 1990, which is a continuation-in-part of Ser. No. 353,811, May 17, 1989, Pat. No. 5,001,974.

[51] Int. Cl.5 .............. B65D 71/00; B65D 85/00; B65D 71/08; B65D 65/00
[52] U.S. Cl. ................... 206/83.5; 206/442; 206/497
[58] Field of Search ............ 206/83.5, 442, 497, 206/526

[56] References Cited

U.S. PATENT DOCUMENTS

| | | | |
|---|---|---|---|
| 3,416,288 | 12/1968 | Coons | 53/27 |
| 3,610,412 | 10/1971 | Morse et al. | 206/497 |
| 3,788,462 | 1/1974 | Meincer | 206/65 |
| 3,884,935 | 5/1975 | Burns, III | 206/497 |
| 3,986,611 | 10/1976 | Dreher | 206/497 |
| 4,036,364 | 7/1977 | Ambrose | 206/526 |
| 4,060,957 | 12/1977 | Birkenfeld | 53/26 |
| 4,178,734 | 12/1979 | Lancaster | 53/399 |
| 4,248,031 | 2/1981 | Del Pozo, Jr. | 53/556 |
| 4,418,510 | 12/1983 | Lancaster, III | 53/399 |
| 4,434,603 | 3/1984 | Beumer | 53/557 |
| 4,593,517 | 6/1986 | Mattila | 53/441 |
| 4,763,574 | 8/1988 | Ast | 100/98 |
| 4,858,415 | 8/1989 | Hake | 53/438 |
| 4,905,448 | 3/1990 | Plitt | 53/399 |
| 5,031,771 | 7/1991 | Lancaster | 206/442 |

FOREIGN PATENT DOCUMENTS 3344940 12/1983 Fed. Rep. of Germany.
2216489 10/1989 United Kingdom.

Primary Examiner—Paul T. Sewell
Assistant Examiner—Marie D. Patterson
Attorney, Agent, or Firm—Baker, Maxham, Jester & Meador

[57] ABSTRACT

A non-palletized unit of cargo of multiple substantially identical high density bales of hay capable of being handled by a forklift truck or the like without a pallet comprises a plurality of substantially identical high density bales of hay, arranged into at least one layer of multiple horizontal rows, and bound together as a unit solely by multiple layers of an elongated continuous sheet of pre-stretched polymeric film having a memory wrapped horizontally around the periphery of the bales of hay.

12 Claims, 4 Drawing Sheets

UNITIZED PALLETLESS MULTIPLE BALE CARGO UNIT

REFERENCE TO RELATED APPLICATIONS

The present application is a which is a divisional of co-pending application Ser. No. 07/526,186, now abandoned, filed on May 18, 1990, which is a continuation-in-part of co-pending application Ser. No. 07/353,811, now filed May 17, 1989, and entitled HAY BALE RECOMPACTING SYSTEM.

BACKGROUND OF THE INVENTION

The present invention relates to a method and apparatus for unitization of multiple units of cargo, and pertains particularly to a method and system for the non-palletized unitization of multiple high density compact bales of hay into units of cargo for optimum utilization of space and for handling by lift trucks and the like.

There has, in recent years, developed an international market for domestically produced hay. In order to meet the needs of this market, the hay must be packaged to provide for efficient and economical handling and shipping. Such economical handling and shipping requires that the packaging be in high density units capable of efficient packaging into shipping containers, efficient mechanical handling, and easily convertible to manual handling.

In the aforementioned parent application, a system and method is disclosed for recompacting or further compacting bales of hay into higher density bales and cutting them into smaller lighter weight units for easier manual handling. That system provides high density, smaller more easily handled cargo units which are desirable for both ease of loading and fitting into cargo space and for manual handling. However, it is also desirable that these units be easily formed into larger units for mechanical handling and shipping.

The typical harvesting of hay involves cutting it and drying it in the field, after which it is typically compressed and bound into bales for easier handling and storage. In the past, the typical field baled bale of hay for local use typically weighs about fifty-five to seventy-five pounds and occupies a space of about 48"×23"×17". The weight may vary by as much as 20% under certain circumstances. Bales of this size and weight are generally considered suitable for local manual handling and storage. However, they are considered too bulky for commercial markets and for long distance shipping, particularly for overseas shipping. For this reason, the standard commercial bale is about one-hundred ten pounds and of about the same dimensions as above. Twenty of such bales weigh a standard or metric ton of about twenty-two thousand pounds.

It has been found that such bales weighing fifty Kg or one-hundred ten pounds can be compacted into a single bale of about 18"×24"×2041 . This is about the same width and height and less than one-half (½) the length of the standard bale. These bales have a high density of on the order of about twenty-two pounds per cubic foot. These can then be split into 18"×12"×20" bales and stacked and bound into one ton and multiple ton, such as twenty ton units for shipment. Also, two bales of the twenty-five Kg or fifty-five pounds weight standard dimension can be compacted into a single bale of the aforesaid size and weight. This recompacting or rebaling conserves considerable cargo space and provides easier handling units for manual handling, but requires some form of unitization for existing mechanical cargo handling and loading equipment.

One form of unitization now used is the mounting of bales of hay on wooden pallets for handling with a forklift truck. The bales are frequently tied or attached to the pallet by means of straps, webbing, netting and by shrink wrap polymer films. However, the pallets take up valuable cargo space and weight and require separate handling and accommodation. Moreover, they are an added cost.

It is desirable that improved means be available for the formation of bales of hay into suitable cargo units for easy and efficient handling and shipping.

SUMMARY AND OBJECTS OF THE INVENTION

It is the primary object of the present invention to provide an improved system for the recompacting and formation of bales of hay into compact high density selectable size non-palletized cargo units.

In accordance with a primary aspect of the present invention, a method of unitizing a cargo of multiple high density hay bales into a non-palletized cargo unit capable of being handled by a forklift truck or the like comprises the steps of selecting a plurality of substantially identical high density bales of hay, arranging said plurality of bales of hay into at least one layer of multiple horizontal rows, and wrapping multiple layers of an elongated continuous sheet of pre-stretched polymeric film having a memory horizontally around said plurality of bales of hay.

Another aspect of the invention includes method and apparatus for further compacting standard bales of hay into bales less than half the standard size, cutting the recompacted bales into two smaller bales for easier handling, and packaging for handling, storage or shipping.

BRIEF DESCRIPTION OF THE DRAWING

The above and other objects and advantages of the present invention will become apparent from the following description when read in conjunction with the accompanying drawings wherein.

DETAILED DESCRIPTION OF A PREFERRED EMBODIMENT

Figure 1:
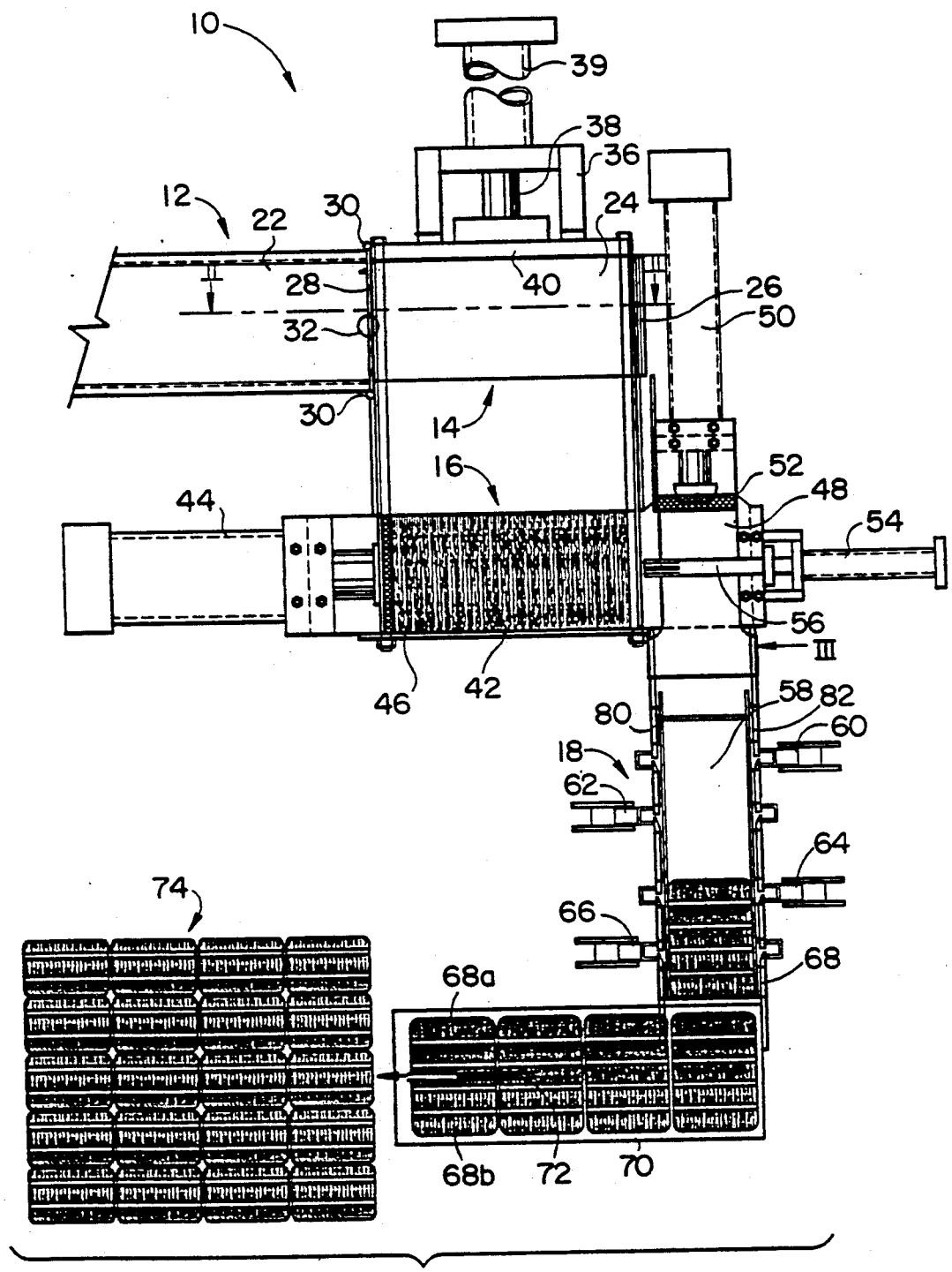
FIG. 1 is top plan view illustrating a preferred embodiment of a hay rebaling system for carrying out the invention.

Referring to the drawings, particularly to FIG. 1, there is illustrated a preferred embodiment of a system for further densifying and sizing of bales of hay in accordance with the present invention. The system, in its preferred form, takes a specifically selected charge of hay, feeds it into a compression chamber, and compresses it into a bale of a specific and uniform size and weight, bands the reduced size bale, and cuts it into two smaller bales of a uniform size. The overall system is illustrated and described in more detail in the aforementioned parent application, which is incorporated herein by reference as though fully set forth.

The illustrated embodiment, designated overall generally by the numeral 10, comprises in its preferred embodiment a conveyor means or system, designated generally by the numeral 12, for conveying broken bales of hay onto an indexing unit 14. The indexing unit in its preferred form includes scales, and a gate or the like for selectively allowing a predetermined amount or weight of hay onto the indexing table. This can be one standard bale if of the desired weight. Thereafter, the indexing unit feeds it into a compression chamber, designated generally by the numeral 16, where the hay is compressed into a substantially smaller bale of about twenty inches in length. This compressed bale is extruded transverse to the compression chamber through a strapping chamber, designated generally by the numeral 18. In the strapping chamber, the bales are bound with two pairs of straps by strapping means and then passed to a cutting unit for cutting the bales into uniform units.

The conveyor 12 may be of any suitable well known type, such as a belt conveyor, with a bolt 22 that continuously runs and preferably is adjustable in speed to accommodate or provide adequate feeding for the compressing function. A belt conveyor that enables the load to slip thereon (i.e. the belt to continuously run beneath the bale) is suitable. The conveyor feeds the hay onto the indexing platform 24, which in its preferred form is the platform of a scale.

The indexing unit (FIG. 1) comprises a horizontal support platform 24 on which the bales of hay are pushed, and at the forward end thereof includes a stop 26 for containing or confining the hay to the platform, which in its preferred form is the platform of a suitable scale. Suitable scales are commercially available and any suitable type may be utilized, such as for example that disclosed in U.S. Pat. No. 4,601,356, which is incorporated herein by reference as thought fully set forth. After a suitable load of hay is pressed onto the indexing platform, a gate 28 descends and prevents further hay from being moved onto the platform. The gate 28 is preferably a blade or shear that is vertically reciprocable on guide rods 30 by means of a ram or the like 32. Thereafter, the indexing ram moves the charge of hay into the inlet side of the compression chamber of the press.

The indexing ram comprises a hydraulic ram or cylinder 34 mounted on a support frame 36. A piston rod 38 is connected to the ram piston (not shown) at one end and to a platen or ram head 40, which engages and moves bales 42 sequentially in the compression chamber 16 of the press.

The charge for the bale of hay is typically a standard one-hundred ten pounds, but may be increased a slight amount, such as to one-hundred eleven to one-hundred twelve pounds to accommodate or compensate for waste in further processing, including the cutting of the bales into suitable size. After the charge of hay 42 is loaded into the compression chamber 16, a compression cylinder 44 is activated by high pressure hydraulic fluid, forcing a platen or ram head 46 forward, and the bale forward into the end of the compression chamber 48.

An extruder cylinder 50 having a ram head 52 on the outer end of the piston rod thereof is then actuated, forcing the bale transverse to the longitudinal axis of the compression chamber into the strapping chamber 18. An air cylinder 54 is mounted at the end of the compression chamber, with a rod 56 that extends into engagement with the bale 42 to hold it together as it is moved into the extrusion chamber 48. The bale 42 is then forced laterally into the strapping or banding chamber, thereby maintaining the bale in its original orientation. As the bale is moved into the strapping chamber, it is positioned for the placement of a first set of straps, which are placed on the bale by means of a plurality of banding machines as illustrated. These banding machines are preferably of the type available from the STRAPAC Company under the trademark "Sivaron", with a Model No. SS-80Y being the most suitable.

These banding machines are disclosed in the company's instruction manual entitled SIVARON, SS-80Y.SS-80T, which is incorporated herein by reference as though fully set forth. These machines have been developed for the placing of banding straps about packages and the like. Typically, such machines have a rectangular track which surrounds a support table for receiving packages and the like, which are strapped or banded while supported on the table. The machines are typically electrically operated and cycle automatically when activated.

In the present invention, four of these banding machine raceways are positioned to encircle the extrusion or strapping chamber, with the machines 60, 62, 64 and 66 in alternate arrangement on alternate sides of the strapping chamber. The strapping chamber is constructed to have peripheral slots that extend around the entire chamber, and enable the bands to be pulled into the chamber and bound around the bales of hay. The bales are suitably indexed to place two pairs of bands thereon. These are placed in pairs as the bale is indexed.

The bale is then extruded from the strapping chamber to a cutting unit where a cutting means, such as a saw blade, is passed through the bale to sever it into two uniform size and weight bales suitable for handling and shipping. In the illustrated embodiment, a conveyor belt 70 receives the compressed bales 68 and carries them to and through a saw blade 72, where they are cut in two smaller bales 68a and 68b and then carried to a stacking area. The saw may be a circular saw or band saw of the type used for sawing lumber. The details of such saws are well known and such details are not believed necessary herein. The bales are then stacked in a stack 74 of either single or multiple layers and bound together into larger units, such as one or multiple ton units for mechanized handling. The stack 74 illustrates a larger of twenty bales of four rows of five bales, and preferably contains two layers to make a one ton unit. The resulting bales will be on the order of approximately fifty-five pounds each, and are stacked such as in two layers of forty to form one ton units.

The strapping chamber is constructed, as more specifically described in the aforementioned parent application, to enable the banding raceways to pass around the chamber, yet to have sufficient strength to retain a bale in its compressed form. As illustrated in the aforementioned application, the chamber comprises a plurality of longitudinally spaced vertically extending complementary pairs of side plates, having a center section forming the side of the chamber, with upper and lower extensions extending upward to and connecting to longitudinally and horizontally extending upper and lower support beams. The upper beam comprises a plate having down turned sides, and an end portion extending downward and secured along an edge of a pair of side plates 80 and 82, and to the end of an upper end chamber plate (not shown). The bottom beam has an identical complementary construction, with up turned side flanges and an end portion or panel extending downward to a bottom chamber plate. Side plates and top and bottom plates form a first portion of the rectangular strapping or banding chamber.

Top and bottom plates are secured between a pair of side plates, and are further supported by upper and lower stand off members, secured thereto and extending at an angle to and secured to the respective upper and lower support beams. This forms a longitudinally spaced section of the strapping chamber, and provides a peripheral banding slot between the first two sections of the chamber. The upper and lower ends of the side plates are narrowed above the chamber as they extend to the upper and lower support beams to provide upper and lower slots 110 and 112 for the upper and lower legs of a banding raceway 114 for banding raceway 60.

Three additional sections of the strapping chamber are constructed in the same manner to provide three additional sections to accommodate the strap raceways of strapping machines 62, 64 and 66. This provides a chamber having annular slots completely through the chamber at spaced points or positions along the longitudinal axis thereof for receiving straps. It further provides an arrangement having slots, through which the raceways of the banding machines can extend above and below the strapping chamber. The straps can then be extended around the chamber, through the raceways, and then tensioned to pull them through the slots in the chamber walls into contact and engagement with the bale of hay therein.

In accordance with operation of the system, the operation is initiated by powering the system up, with motors driving pumps to establish a predetermined pressure in the power system which powers the rams. A pilot control motor and pumps are operated to provide the necessary pilot control where appropriate. A CPU, which has been previously programmed to initiate and control operation of the system, is activated to initiate operation of the system. The system begins by operation of conveyor 12 for feeding hay onto the indexing table 24, where an appropriate amount or quantity of hay is selected by weighing, for example, and then activating the gate or knife 28 for cutting off the flow of hay onto the table or scale. The indexing cylinder 39 then moves the hay laterally into the compression chamber 16, wherein the compression ram 44 is activated to compress the hay into the compression chamber, where the extruding cylinder is then actuated to force the bale laterally from the end of the compression chamber into the strapping chamber. As the bale is moved into position in the strapping chamber, a first pair of strapping machines are activated to apply the first set of straps to the bale. Thereafter, the bale is further indexed to a second position, wherein a second pair of straps are applied to the bale, and the bale then moved to a position to be cut by the bale cutter into two miniature size bales. The bales are then ejected and then stacked into a stack 74 for shipping or the like.

Figure 2:
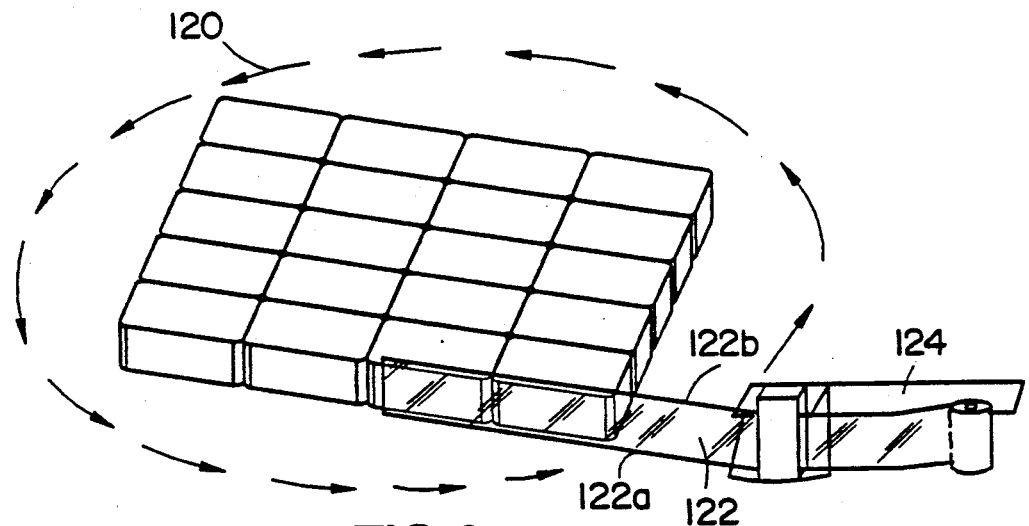
FIG. 2 is a perspective view illustrating the process of the invention.

Referring to FIG. 2, the recompressed and resized bales as above described are moved to a position and arranged in a suitable stacked or arrangement as illustrated in FIG. 2 for forming into a cargo unit. In the illustrated stack, designated generally by the numeral 120, the stack may consist of two layers of the duly formed bales in arrangements of twenty bales per layer forming a one ton stack. This stack is unitized in accordance with the present invention solely by the application of a continuous inwardly directed lateral force on the peripheral sides of the stack by means of a continuous sheet 122 of a suitable polymeric film, such as polypropylene, which is pre-stretched by a suitable apparatus, designated generally as 124, which will be more fully described. The film is wrapped around the sides of the stack, as illustrated, a number of times, on the order of about four to ten, but preferably about seven to eight times. The polymeric film may be from about one to three mils. in thickness, but is preferably on the order of one and a half mils. initially and is stretched up to 220%, thereby considerably reducing the thickness of the film and essentially removing the stretch from the film.

The film has a memory, and once in place, tends to or attempts to return to its original position, thus imposing a compressive force or band around the stack of hay bales. This compressive force is inwardly directed and forces each of the bales into binding engagement with laterally adjacent bales, binding them into a non-palletized unit without support by a pallet or a bottom sheet. The film is not elastic like rubber, but returns to original size over a period of time, such as several hours. The film may be pre-stretched from about 25% up to about 220%. The preferred stretch appears to be around 200% to 220%.

It has been found that this form of unitization of a stack is best accomplished by a lower edge of the film 122a, and an upper edge of the film 122b extending beyond the lower and upper surfaces respectively of the stack, such that the edges overlap and pull inward essentially enveloping the sides and part of the top and bottom of the bale. This can be accomplished by using a film having a width exceeding that of the height of the stack or alternately by first overlapping the lower surface of the stack, and moving the film upward until the upper edge overlaps the upper surface.

Film stretching units designated 124 are available which consist of a plurality of roller units driven within a supporting frame, which take a continuous sheet of film 122 from a roll 126 and pass it through spaced apart pairs of rollers which stretch it to the selected amount. Such units are available from TW Mima Corporation, Pompana Beach, Fla. under Model Number JT-21. These are available under the Trademark Cobra IV.

Figure 3:
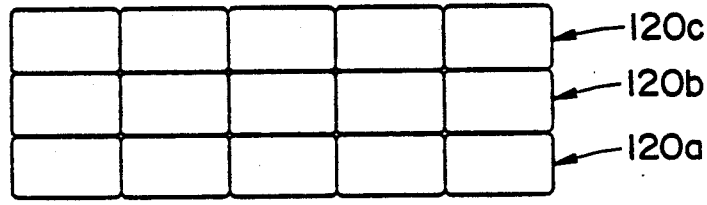
FIG. 3 is a front elevation view illustrating a step in the process of the invention.
Figure 4:
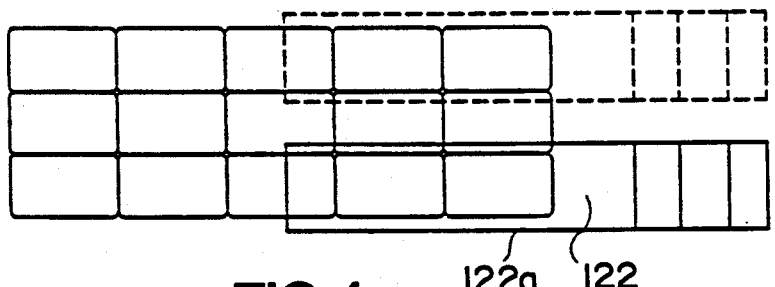
FIG. 4 is a view like FIG. 3 illustrating a further step in the process of the invention.

Selected unitized stacks or layers of bales of hay may be themselves stacked, as illustrated in FIG. 3, and again further unitized into a stack as shown for example in FIG. 4. In such an arrangement, a first stack 120a is unitized by wrapping the upper two stacks 120b and 120c and are similarly wrapped and placed on the lower stack, as shown in FIGS. 3 and 4. Thereafter, the entire stack is made up of a combination of three stacks and is again wrapped, as shown in FIG. 4. This can be accomplished, as illustrated in FIG. 4, beginning at a lower level, such that a lower edge 122a of the film 122 extends below and overlaps beneath the lower stack 120a, and as the lower unit is wrapped by several layers, the carriage moves upward as shown in phantom to cover the entire stack and overlap the upper surface of the upper unit 120c. This approach provides an arrangement wherein two or more separately wrapped units may be wrapped together as a unit and shipped to its destination. At the destination, the outer wrapping may be removed from the entire cargo unit, leaving the multiple individual cargo units. Thereafter, each unit may be broken and the bales removed therefrom as needed, while the remaining cargo units may be retained in tact by the pre-stretched film. Thus, many smaller modular cargo units may be bundled or bound together in a larger modular unit for shipping, and then broken down into separate modular units for use in final destination.

Figure 5:
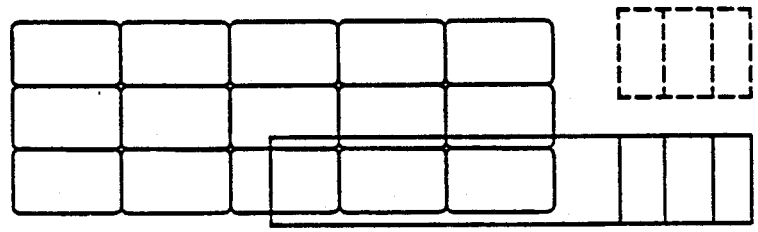
FIG. 5 is a view like FIG. 4 illustrating an alternate process of the invention.

Referring to FIG. 5, there is illustrated an approach to the unitization of a larger stack of bales wherein three double layers of stacks, as illustrated in FIG. 2, are placed together in a larger stack 126 before wrapping, and the entire stack 126 wrapped as a single unit. This unitization can be carried out without the need for mounting or loading the bales on pallets as would normally be required. It has been found that with from about five to about ten film layers polypropylene film having an initial 1.5 mil. thickness can effectively bundle or unitize a two to four ton stack without the use of pallets. These stacks can be effectively handled with conventional forklift trucks without the need for pallets. These can be bundled or formed into cargo units for fitting into cargo containers for containerized shipping. This approach eliminates the need for pallets which take up space and require separate and additional handling. This approach considerably reduces the cost of packaging and shipping.

Figure 6:
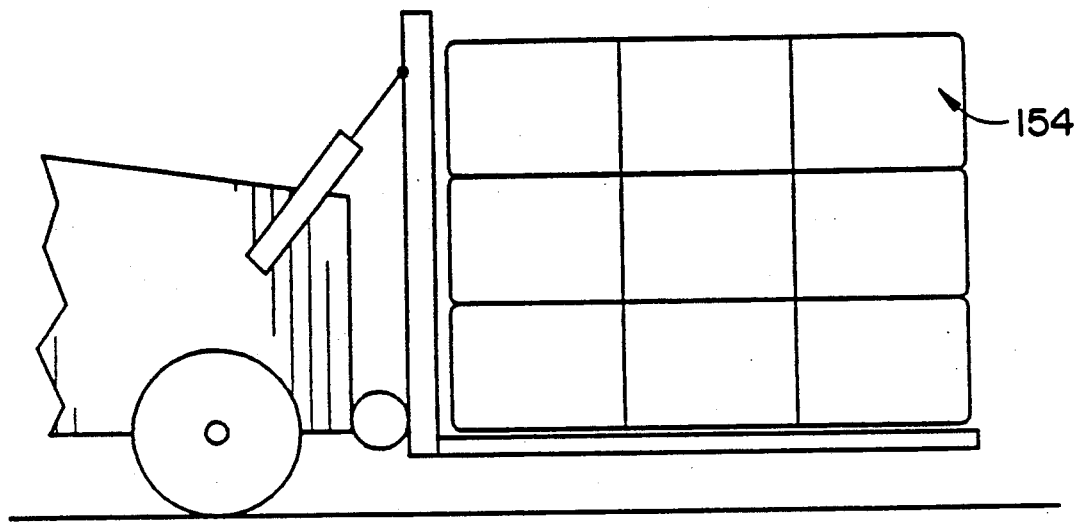
FIG. 6 is a side elevation view of a unitized load in accordance with the invention being handled by a forklift truck.

Referring to FIG. 6, there is illustrated a conventional forklift truck handling a unit of cargo consisting of a stack of bales of hay bound together by polymer film in accordance with the invention. The conventional forklift truck is well known and has a pair of spaced apart elongated tines that extend forward for extending into slots in a pallet for supporting and handling a load. These elongated tines of a forklift truck can extend under the bottom layer of bales, directly engaging the bottom surface of the bottom layer of bales without damage thereto.

Figure 7:
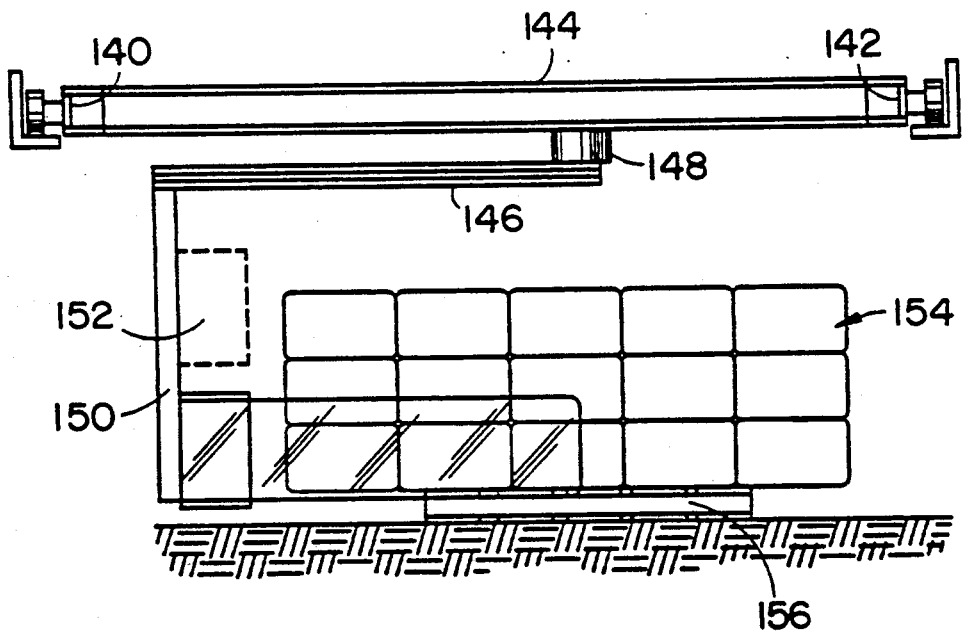
FIG. 7 is a front elevation view of an apparatus for carrying out the process of the present invention.
Figure 8:
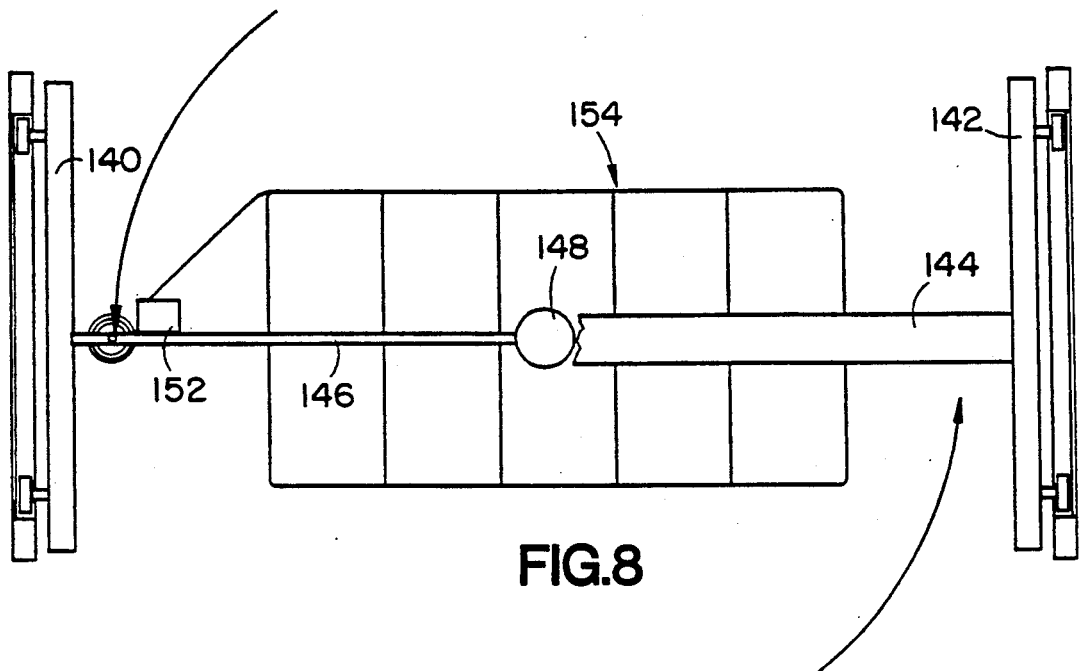
FIG. 8 is a view taken on lines 8-8 of FIG. 7.

Referring to FIG. 7, an apparatus is illustrated for carrying out the wrapping operation. As illustrated, a support structure comprises a support structure comprising a generally H beam framework comprising a pair of parallel beams 140 and 142, which may be either stationary or mounted for movement along an overhead track, with a support beam 144 extending therebetween. A rotating arm 146 is mounted from a central rotatable support drive means 148, such as electrical or hydraulic motors for rotating the arm around a stack of cargo. The arm extends outward and includes a downwardly extending track member 150 on which is mounted a film dispensing and stretching unit 152, which is carried around a stack 154 of hay supported on suitable support structure, such a conveyor or the like 156. The film dispensing head 152 rides up and down the vertical track 150 for positioning the film on the sides of the stack 154.

In a typical example, the film is started at the bottom or lower end of the stack, with the lower edge of the film overlapping the lower edge of the stack, as illustrated, and the dispensing unit 152 is carried around the stack by arm 146 wrapping the outer surface of the hay stack with the pre-stretched film. From about four to about eight layers of the film are applied to the lower portion of the stack before the dispensing head begins to move upward to the top, where another four to ten layers are applied around the upper layers of bales on the stack, with the upper edge of the film overlapping the top of the stack. Intermediate the upper and lower layers of film, the layers may be lesser than that at the top and bottom and still retain the unitized unit of cargo.

Figure 9:
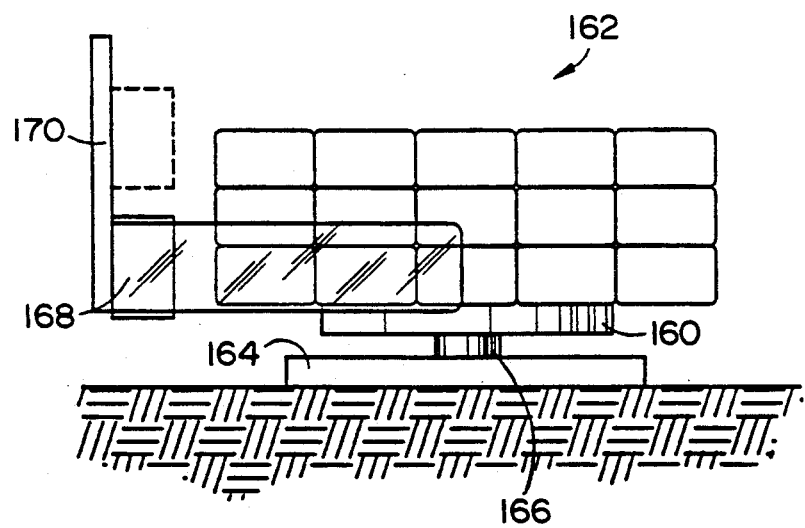
FIG. 9 is an alternate embodiment of an apparatus for carrying out the process of the present invention.

Referring now to FIG. 9, there is illustrated an alternate approach to the wrapping of stacks of bales of hay. In this illustrated embodiment, a turntable 160 supports a load of hay, designated generally by the numeral 162, for rotation. The turntable comprises essentially a base member 164 with suitable driving, such as a motor driving through a support shaft 166. A film dispensing head 168 is mounted on a stationary vertical support member 170 for vertical movement for moving in the sheet of film vertically along the rotating stack of hay. The sheet of film, as in previous embodiments, is started preferably at the bottom, but may be started at the top and overlaps as previously described to pull inward along the edge of the bottom surface, and likewise inward along the upper surface to essentially encompass the bales of hay into a unitary cargo. These unitized bales of hay can be handled with forklift trucks as previously described. This eliminates pallets and the expense and handling thereof.

While we have illustrated and described our invention by means of specific embodiments, it is to be understood that numerous changes and modifications may be made therein without departing from the spirit and scope of the invention as defined in the appended claims.

We claim:

1. A non-palletized unit of cargo consisting of multiple high density bales of hay capable of being handled by direct engagement of the bottom surface thereof by the tines of a fork lift truck, comprising:
    a plurality of partially compressible bales of hay arranged in at least a first layer of multiple rows of said bales of hay defining vertical peripheral sides and a planar bottom support surface extending to said peripheral sides; and
    binding means consisting essentially of an elongated sheet of a polymer film pre-stretched from about 25% to about 220% wrapped in multiple layers solely and snugly around and in direct engagement with the peripheral sides of said stack of bales for applying a continuous laterally inwardly directed force for biasing said bales inwardly thereby at least partially compressing and forcing the vertical surfaces of the bales into partially interlocking binding engagement with laterally adjacent bales for binding said bales together as a unit without a bottom engaging support sheet while maintaining said layer in place due to said partially interlocking of the vertical surfaces of the bales, with an edge portion of said sheet film overlying an edge portion of the top of said stack around the periphery thereof, and an edge portion of said film overlying an edge portion of the bottom of said stack around the periphery thereof.

2. A non-palletized unit of cargo according to claim 1 wherein said stack comprises multiple layers of said multiple bales of hay.

3. A non-palletized unit of cargo according to claim 2 wherein said bales of hay are on the order of about 18"×12"×20" and weigh between about fifty to seventy pounds.

4. A non-palletized unit of cargo according to claim 1 wherein said unit of cargo comprises multiple layers of said bales of hay, and separate ones of said layers are separately bound together by a first multiple layers of said film; and said multiple layers of bales of hay are bound together by a continuous sheet of said film extending around the periphery of said stack.

5. A non-palletized unit of cargo according to claim 1 wherein said bales of hay are on the order of about 18"×12"×20" and weigh between about fifty to seventy pounds.

6. A non-palletized unit of cargo according to claim 1 wherein said stack comprises a second layer of said multiple bales of hay co-extensive with said first layer.

7. A palletless unit of cargo consisting of multiple bales of hay bound together as a unit for handling by direct engagement of a bottom planar surface thereof by a forklift truck without a pallet, consisting essentially of:

a plurality of partially compressible bales of hay arranged in a stack without overlapping interlocking bales of at least a first and a second layer of multiple rows of multiple bales of hay defining vertical peripheral sides and a planar bottom surface peripherally co-extensive with said peripheral sides; and peripheral binding means extending solely around and in direct engagement with said peripheral sides of said stack for applying a continuous laterally inwardly directed force for at least partially compressing and forcing the vertical surfaces of said bales into partially interlocking binding engagement with laterally adjacent bales for binding said bales together as a unit solely by said continuous laterally inwardly directed force without a bottom engaging support sheet while maintaining said bottom layer in place due to said partially interlocking of the vertical surfaces of the bales, said binding means consisting essentially of an elongated sheet of a stretchable film having a memory pre-stretched from about 25% to about 220% wrapped in multiple layers snugly solely around the periphery of said stack of bales.

8. A palletless unit of cargo according to claim 7 wherein said stack comprises a second layer co-extensive with said first layer of said multiple bales of hay.

9. A palletless unit of cargo according to claim 8 wherein said bales of hay are on the order of about 18"×12"×20" and weigh between about fifty to seventy pounds.

10. A palletless unit of cargo according to claim 7 wherein said unit of cargo comprises multiple co-extensive layers of said bales of hay, and separate ones of said layers are separately wrapped by a first multiple layers of a sheet of said film; and said multiple layers of said bales of hay are bound together by a continuous sheet of said film extending around the periphery of said stack and extending from the top to the bottom thereof.

11. A palletless unit of cargo consisting of multiple substantially identical high density hay bales capable of being handled by a forklift truck or the like without a pallet formed by a process comprising the steps of:

selecting a plurality of substantially identical high density partially compressible bales of hay;

arranging said plurality of bales of hay into a stack of multiple co-extensive layers of multiple horizontal rows forming a stack without overlapping interlocking bales having peripheral sides and a planar bottom surface peripherally co-extensive with said peripheral sides; and binding said plurality of bales into a self-supporting unit solely by the application of a continuous lateral force on the peripheral sides of said stack for at least partially compressing and forcing the vertical sides of each of said bales into partially interlocking binding engagement with one or more laterally adjacent bales for holding them against vertical movement relative to one another without a bottom engaging support sheet while maintaining said bottom layer in place due to said partially interlocking of the vertical surfaces of the bales, said application of a continuous lateral force carried out by the step of wrapping said stack with sufficient multiple layers of an elongated continuous sheet of pre-stretched polymeric film having a memory solely horizontally around solely in direct engagement with said peripheral sides of said stack for binding said stack as a unit for support by direct engagement of said planar bottom surface on a pair of tines of a forklift truck without a pallet.

12. A palletless unit of cargo according to claim 10 wherein said step of wrapping said film around said bales of hay includes a first step of separately wrapping separate layers of said of hay and then continuously wrapping said entire stack.

* * * * *